No. 896,013. PATENTED AUG. 11, 1908.
J. A. H. HATT.
CAMERA.
APPLICATION FILED JUNE 18, 1907.
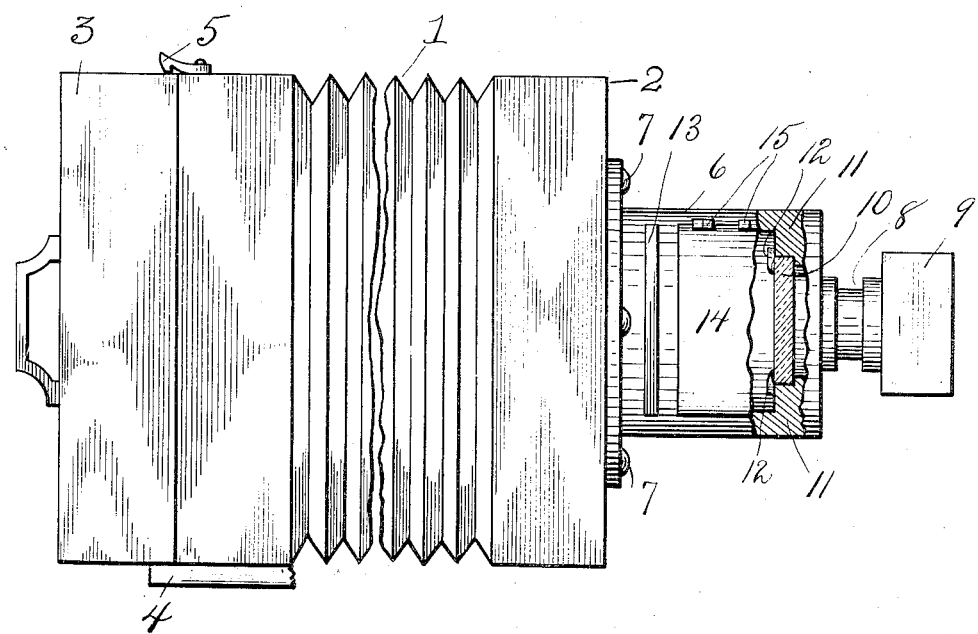
Witnesses
Albert Popkins
Mary W Hammer
Inventor
J. A. H. Hatt
By John D Morgan
Attorney

UNITED STATES PATENT OFFICE.

JOSEPH ARTHUR HENRY HATT, OF BROOKLYN, NEW YORK.

CAMERA.

No. 896,013.        Specification of Letters Patent.        Patented Aug. 11, 1908.

Original application filed February 10, 1906, Serial No. 300,371. Divided and this application filed June 18, 1907.
Serial No. 379,561.

*To all whom it may concern:*

Be it known that I, JOSEPH ARTHUR HENRY HATT, a citizen of the United States, and a resident of the borough of Brooklyn, in the county of Queens and State of New York, have invented certain new and useful Improvements in Cameras, of which the following is a specification.

The invention relates to cameras and in certain aspects thereof especially to cameras used in the photomechanical processes, although in certain of its features it is applicable to other cameras.

Objects of the invention are to provide a camera with a simple and convenient arrangement of parts; in which access is readily had to removable and adjustable parts and the insertion or removal or adjustment of parts may be effected with ease and rapidity and without disturbing other parts; to provide for rapidly and easily changing the camera so that it may be adapted for different kinds of work; to provide for control of the passage of light in the camera so that various parts may be adjusted, inserted, or removed without inconvenience and without special care being bestowed upon other parts to protect them from the action of light. These and other objects of invention will in part be obvious and in part will more fully appear hereinafter.

The invention consists in the novel parts, articles, arrangements, combinations, and improvements herein set forth.

This application constitutes a division of application Ser. No. 300,371, filed by me on Feb. 10, 1906.

The accompanying drawing, referred to herein and forming a part hereof, illustrates an embodiment of the invention and serves in connection with the description herein to explain the principles thereof.

The drawing shows a view in elevation of a camera, parts of which are constructed in accordance with the principles of the invention.

Referring to the particular embodiment of the invention illustrated by way of example in the accompanying drawing, the said embodiment will be seen to comprise a camera having a lens mounted at the front thereof, and mounted in convenient relation to the lens a color filter, such as is used in various branches of photography but principally in what is known as color process work. The lens and color filter may be mounted in different arrangements as may be found convenient, but as shown herein the color filter is arranged back of the lens and within the camera. In the said drawing the body of the camera is indicated by the reference numeral 1 and the front board by the reference numeral 2. Suitable means for properly positioning a sensitized plate with reference to the lens are provided, and said means may be of any suitable and convenient form, so far as concerns many features of the invention. As shown in the drawing herewith the plate is received at the rear 3 of the camera, the camera being provided with means for receiving a plate holder, said means comprising a ledge 4 and spring hook 5.

The lens and the color filter may be carried detachably attached to the camera and they are so shown in the drawing. As illustrated, an auxiliary chamber 6 is shown detachably attached to the front board 2 in any convenient manner, as by a series of screws 7. At the front of the said chamber is carried a lens 8 and when desired a reversing prism may be used in conjunction therewith. A prism 9 is accordingly shown mounted in front of the lens. In the drawing a color filter 10 is shown mounted within the chamber 6, a suitable support 11 for removably supporting the color filter in proper relation to the lens being provided.

Any suitable devices for holding the color filter in position on its support may be used, and a form of such means is shown in the drawing as comprising spring clips 12. In order that these parts may be put on or taken off or adjusted without affecting the plate, means are provided, arranged intermediately of the plate holder and the light-transmitting devices, such as the lens and color filter, for controlling the passage of light.

As illustrated in the drawing a dark shutter is provided for the purpose indicated, located in the chamber 6 between the color filter and lens on the one hand and the body of the camera on the other. Such dark shutter may be of any convenient form for arresting or permitting the passage of light and is shown herein as a slide 13 arranged to entirely cut off the chamber 6 when closed.

Means are provided for permitting access to the interior of the chamber 6 so a to permit of adjustment or insertion or removal of the color filter or other parts which may be located within the chamber and a form of such means is herein shown as comprising a light-tight door 14 in the side of the chamber 6. The said door may be mounted in any suitable manner and as illustrated herewith it is shown as mounted upon suitable hinges 15 at the top edge thereof, and when opened upwardly will remain open without any fastenings. By this arrangement it will be seen that when the dark shutter 13 is closed the door 14 may be opened without permitting light to pass into the body of the camera. While the chamber 6 is shown herein of cylindrical form, it will be obvious that it might be of a rectangular form where convenient. Also, if desired, the color filter may be arranged to slide on edge into its support.

It will be understood that among the advantages realized by this invention is the ability of easily and expeditiously removing one auxiliary chamber 6 from the camera body and the attachment of another where it is desired to use a different combination or a different lens, or for any other purpose desired. Furthermore, by means of the door 14 the color screens may be changed for others of different density or of different actinic effect quickly and expeditiously while in the handling of the camera the color screen is out of the way and is protected from displacement or injury. Also, it is not necessary to remove a particular screen if the prism is used or laid aside for a particular job, nor is it necessary to furnish mountings for the color screens suitable for the lens and another set suitable for the prism.

Other advantages will be obvious to those skilled in the art or will be realized by practice with the invention.

I wish it to be understood that I do not desire to be limited to the exact details of construction shown and described, for obvious modifications will occur to a person skilled in the art.

What I do claim as my invention and desire to secure by Letters Patent, is:

1. A camera including in combination a camera body, a detachable chamber carried at the front thereof, said chamber containing a color filter and a door for giving access to the said filter.

2. A camera including in combination a camera body, a chamber detachably carried at the front thereof, said chamber containing a color filter and having a doorway for giving access to the said filter, and a dark shutter constructed and arranged to control the passage of light between the said chamber and the body of the camera.

3. A camera including in combination a camera body, a chamber detachably carried at the front thereof, said chamber containing a color filter and having a doorway for giving access to the said filter, and a dark shutter located within the said chamber between the said door and the body of the camera so as to control the passage of light between the said chamber and the body of the camera.

4. A camera including in combination a camera body, a chamber detachably attached to the front thereof, a lens mounted on the said chamber, a color filter removably mounted within the said chamber, and a door in the said chamber for giving access to the color filter.

5. A camera including in combination a camera body, a chamber detachably attached to the front thereof, a lens mounted on the said chamber, a color filter removably mounted within the said chamber, a door in the said chamber for giving access to the color filter, and a dark shutter located within the said chamber between the said door and the body of the camera so as to control the passage of light between the said chamber and the body of the camera.

In testimony whereof, I have signed my name to this specification, in the presence of two subscribing witnesses.

JOSEPH ARTHUR HENRY HATT.

Witnesses:
JOHN D. MORGAN,
CLARA PHILLIPS.